(12) United States Patent
Guion

(10) Patent No.: US 7,017,804 B2
(45) Date of Patent: Mar. 28, 2006

(54) METHOD FOR PROVIDING IDENTIFICATION DATA OF A BANKING CARD TO A USER

(75) Inventor: Christian Guion, Verrière le Buisson (FR)

(73) Assignee: Axalto S.A., Montrouge (FR)

( * ) Notice: Subject to any disclaimer, the term of this patent is extended or adjusted under 35 U.S.C. 154(b) by 0 days.

(21) Appl. No.: 10/362,980

(22) PCT Filed: Aug. 9, 2001

(86) PCT No.: PCT/FR01/02582

§ 371 (c)(1),
(2), (4) Date: Feb. 28, 2003

(87) PCT Pub. No.: WO02/19284

PCT Pub. Date: Mar. 7, 2002

(65) Prior Publication Data

US 2003/0194989 A1    Oct. 16, 2003

(30) Foreign Application Priority Data

Aug. 28, 2000  (FR)  .................................. 00 11004

(51) Int. Cl.
*G06K 5/00* (2006.01)

(52) U.S. Cl. ...................................... 235/380; 235/379

(58) Field of Classification Search ................ 235/380, 235/381, 383, 375, 379; 705/18, 26

See application file for complete search history.

(56) References Cited

U.S. PATENT DOCUMENTS

| | | | |
|---|---|---|---|
| 5,530,438 A * | 6/1996 | Bickham et al. ............. 340/5.8 |
| 5,719,918 A * | 2/1998 | Serbetciouglu et al. ..... 380/271 |
| 5,883,810 A | 3/1999 | Franklin et al. |
| 5,956,699 A | 9/1999 | Wong et al. |
| 5,971,272 A * | 10/1999 | Hsiao ......................... 235/380 |
| 5,991,372 A * | 11/1999 | Davenport D'Ingianni et al. ....... 379/91.02 |
| 6,000,832 A | 12/1999 | Franklin et al. |
| 6,078,908 A * | 6/2000 | Schmitz ....................... 705/50 |
| 6,163,771 A * | 12/2000 | Walker et al. ................ 705/18 |
| 6,250,557 B1 * | 6/2001 | Forslund et al. ............ 235/492 |
| 6,339,766 B1 * | 1/2002 | Gephart ....................... 705/44 |
| 6,422,462 B1 * | 7/2002 | Cohen ......................... 235/381 |
| 6,425,523 B1 * | 7/2002 | Shem-Ur et al. ........... 235/380 |
| 6,543,686 B1 * | 4/2003 | Ritter ......................... 235/380 |
| 6,557,753 B1 * | 5/2003 | Beaujard et al. ............ 235/375 |
| 6,805,288 B1 * | 10/2004 | Routhenstein et al. ...... 235/380 |
| 6,807,410 B1 * | 10/2004 | Pailles et al. ................ 455/407 |
| 2001/0037264 A1 * | 11/2001 | Husemann et al. ........... 705/26 |
| 2003/0004891 A1 * | 1/2003 | Van Rensburg et al. ...... 705/64 |
| 2003/0041026 A1 * | 2/2003 | Heinonen et al. ............. 705/41 |

FOREIGN PATENT DOCUMENTS

| WO | WO 99/49424 | 9/1999 |
| WO | WO 00/33497 | 6/2000 |
| WO | WO 00/49586 | 8/2000 |

* cited by examiner

*Primary Examiner*—Ahshik Kim
(74) *Attorney, Agent, or Firm*—Osha Liang LLP

(57) ABSTRACT

The invention concerns a method for securely providing identification data of a banking card to a user. The invention is characterized in that said identification data of the banking card are directly created by said user from appropriate generating means (6, 1), the resulting generated card data are then communicated through telecommunication means (6, 5; 1, 2) to a computer server of a financial institution managing said card.

5 Claims, 1 Drawing Sheet

METHOD FOR PROVIDING IDENTIFICATION DATA OF A BANKING CARD TO A USER

FIELD OF THE INVENTION

The invention concerns a method for securely providing identification data of a banking card to a user.

This invention concerns especially the supply of temporary card numbers also called payment cards with limited use allocated by banks to their clients in order to secure their deals on Internet.

BACKGROUND OF THE INVENTION

The expression "payment card" is used to designate any bank card with a delayed or immediate debit, any credit card, etc., issued by a bank or a specialised establishment.

The safety of deals made with payment cards is today based on two points: the checking of the signature genuineness as written by the buyer on the invoice, a handwritten or electronic signature, and the checking of the card validity by questioning the establishment who issued the card in order to obtain permission to accept this card.

This double checking is always made by the supplier when he can physically have the payment card. Checking the handwritten or electronic signature is easy, the same applying to the prior authorisation request. There are also card-reading payment terminals that are adapted to execute automatically such checking.

The buyer types on the keyboard of such terminal the secret code for his card, also called PIN code (Personal Identification Number). The electronic circuits then compare the secret code typed by the buyer with the code registered on the card in a cryptic manner and they validate the current deal if they coincide. Also, starting from the data read on the card, the terminal is able to question through a telecommunication network, a management server for payment cards who confirms that the card is valid and not imposed with interdiction. This checking as to the card validity may be made on line by calling the server at the time of the deal, or off line through the regular downloading of lists of forbidden cards (black lists) and/or true card lists (white lists). It should be noted that the use of cards with electronic circuits enables a direct checking of the card genuineness.

Consulting the management servers to find out the status of a payment card and the use of a secret code known only by the card owner considerably reduce the possibility of frauds.

It is not however so when the buyer and the seller are distant one from the other and it is then no more possible to use, to check the card, a payment terminal that reads cards.

As, in order to execute a deal when the buyer and the seller are away from each other, for example when buying by mail, or if a booking is made by phone, or when a deal is executed on the Web, the seller only asks for the card number and the validity date of the buyer's payment card.

Communicating this information alone is sufficient to validate an invoice that the supplier then sends to his bank for payment.

The simplicity of the present mechanism for payment by card for deals executed away is the source of many frauds, as any person knowing the number of a payment card and its validity date may use this information in an illegal manner to buy goods or services and this, as long as the actual card owner is not aware of the misuse caused to him and does not stop payments at the card issuing institution. Also, such system allows improper refusals by dishonest buyers who refuse to have their account debited under the false excuse that the deals were executed unknown to them. This is particularly true for electronic deals executed over Internet, as on such an open communication network, it is rather easy to collect information there exchanged. Such lack of safety is today a strong brake for the Internet trading.

Many tries have been made to eliminate this inconvenience and make the distant deals safer, especially the electronic deals.

Among such tries, there should be mentioned the SET type systems that consist in coding the information exchanged on Internet. With such systems, the bank card numbers are no more openly communicated, and cannot therefore be intercepted. The implementation of such systems is however impaired by the availability for most people of means specifically provided for the safety of deals, such as card readers for computers, coding means in computers or in readers, and standardising the protocols selected by various operators. Also, if numbers can no more be directly intercepted during the communication between the buyer and the Web site, they may still be intercepted on the Web site where the card numbers are stored in a clear manner and they may be intercepted on the computer of the person from spying resident programmes adapted to record information typed by the person on his keyboard.

Another way consists in using a temporary payment card or one with a limited use. Such a card is generally made by the financial institution of the buyer, on his request. This card, the life of which is generally limited for one deal or a given sum of money, is mainly using the same ISO formats as the buyer's main payment card (Visa, Mastercard, etc.)

This solution thus requires the transmission to the buyers, in a secure way, of temporary card numbers. The solution that is generally chosen by the banks consists in using coded SSDL-type connections between the computers of the buyers and the bank servers. This method still has fraud risks, as the methods developed by the cheaters on Internet are more and more performing.

The purpose of this invention is therefore to offer an alternative for transmitting in a confidential way to users the identification data of temporary cards, such as numbers and validity dates, an alternative that should be together safe and easy to operate.

SUMMARY OF THE INVENTION

The method according to this invention is therefore intended to securely provide to a user identification data for a payment card.

According to this invention, the method is characterised in that the said identification data for the payment card are directly created by the said user from appropriate creation means, the data so created for the card being then communicated by telecommunication ways to a computer server of a financial institution who manages the payment card.

According to another characteristics of the method subject of this invention, the identification data for the card consist in the number and the validity date of the said payment card.

According to another characteristics of the method subject of this invention, the identification data for the card are directly created using a phone especially adapted for this.

According to another characteristics of the method subject of this invention, the identification data for the card are developed by an appropriate software on the SIM Microprocessor card fitted on a cellular radio telephone of the GSM type.

According to another characteristics of the method subject of this invention, the telephone automatically passes on the card said identification data to the managing server.

According to another characteristics of the method subject of this invention, the card data are communicated to the managing server via the cellular radiotelephone network in the form of an SMS message.

According to another characteristics of the method subject of this invention, the identification data for the payment card are directly created using a PC.

According to another characteristics of the method subject of this invention, The PC automatically communicates the identification data for the card to the managing server using the Internet network.

According to another characteristics of the method subject of this invention, the payment card is only valid for a limited number of deals and for a limited time.

According to another characteristics of the method subject of this invention, the payment card is only valid for a single deal.

DETAILED DESCRIPTION OF THE INVENTION

Figure 1:
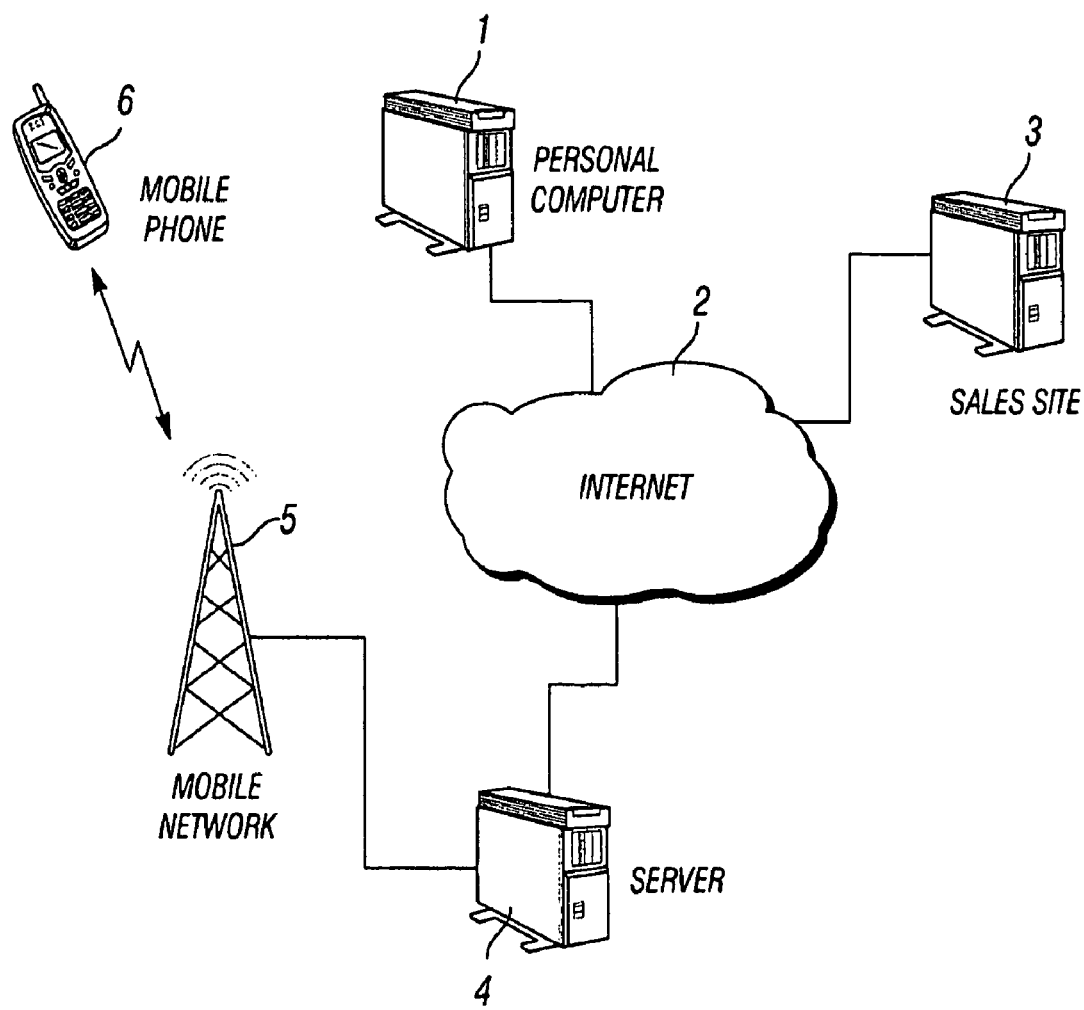
FIG. 1 shows a schematic view of the system required for implementing the method in accordance with one or more embodiments of the invention.

The aims, features and advantages of this invention will be better understood with the description given hereafter of several execution modes for this invention, shown as non-limiting examples, referring to the attached drawing, where:

FIG. 1 is a schematic view of the system required for implementing the method according to this invention.

By referring to FIG. 1, the only items shown are those useful for understanding the invention.

The example chosen to illustrate the method and its implementing device according to the invention concerns the use of a temporary payment card to execute an electronic deal on the Internet network. Of course, this invention is not limited to this single example and more generally concerns the safe communication of identification data for a payment card, such as its number, its validity date, or a PIN code, such communication being between two distant sites and particularly between the domicile of a user and his financial institution.

According to FIG. 1, the system required for implementing the invention is as follows. A buyer is sitting in front of a computer, for instance his PC (ref. 1) which is fitted with a modem enabling its connection with the Internet network (2). The computer (1) may be connected via the Internet network (2) to the server (7) of a sales site offering the sale of goods or service such as a service for the sale of books. The computer (1) can also be connected via the Internet network (2) with the managing server (4) of his financial institution.

The link between the managing server (4) and the buyer's PC is preferably made safe, by being for example of the SSL type.

The buyer also has a mobile telephone (6) including a SIM (Subscriber Identity Module) card. This telephone (6) can receive or send data via a network (5) of GSM-type or other radio-telecommunication, which data come from or go to the server (4) in the form of radio-electric messages sent according to a protocol called short message service, also known under the name of SMS (Short Message Service). This protocol authorises messages of 160 characters. It is possible to attach up to fifteen consecutive messages, i.e. 2400 characters in a message. Further, this protocol exists on all mobile phones in the market. It is generally used by operators, for instance to advise their subscribers that they have received new messages in their message box.

Once the buyer has been connected to the sales site (3) via the Internet network (2) and he has chosen to buy a book, he receives from site (3) a registering form for his order, in which must be entered various information, such as the number and the validity date of a payment card. If the buyer does not wish to communicate openly information concerning his own payment card, he will use instead a temporary card he will create himself.

These temporary payment cards are very similar for the services offered to the buyer's permanent card. They are for the same bank account and can be accepted by the same shops as the permanent card (Visa, Mastercard, etc. networks). Their main differences are in their being only valid for a limited number of deals and preferably for a single deal. Preferably, these cards have a validity relatively short, from a few dozen seconds to a few days.

Although they may be used for any business deal, these temporary payment cards are particularly adapted for remote deals. The temporary payment cards may in particular have no physical support (temporary display on a screen or verbal communication).

Outside these differences, the temporary payment cards are perfectly similar to the other cards, especially regarding the size and the coding of their number or their validity date (4-digit format: month/year (07/01)). So, if the classical payment cards have 16-digit numbers, according to the ISO standard now in force, each number of a temporary card also has sixteen digits: the first six digits make up the BIN code for the issuing financial institution and the last digit is the Luhn authentication code (CHECKSUM).

Of course the sixteen digit format is not a limit in the invention, the temporary card numbers being able to take any other shape: a series of nineteen digits, an alphanumerical series with a given length, etc.

It is also possible to provide each temporary card with a secret code named PIN code (Personal Identification Number). The temporary card may also more precisely bear its date and time of validity (for example in the format day/month/year time (27/07/01 14:31)), this information being only for the card owner.

It is therefore the buyer who himself generates his temporary card starting with an appropriate algorithm installed on his computer or on the electronic SIM card of his mobile phone (6).

Let us first consider the use of the phone (6) to create a temporary card. The buyer who wishes to make a purchase takes his phone (6) and starts the programme adapted for creating a temporary card. The implementation of this programme requires typing on the keyboard of the telephone (6) the characteristics of the temporary card and, in particular, the amount authorised and the validity.

The programme gives him in return all the data characteristic of the card he created, which are displayed on the screen of his telephone (6) or are simply given verbally in the earphone of his equipment. Such identification data are the sixteen-digit number, a validity date and possibly an associated secret code.

The temporary card having been created in a first step, the said programme transfers as a second step, all the characteristics of the card to the server (4) of the financial institution where is kept the bank account to which is associated the temporary card and who will manage this temporary card.

Such transfer is made automatically via the telephone network with which is linked the user's telephone (6) in the form of an SMS message (Short Message Service).

The server (4) adapted to receive such SMS message then manages this new temporary card in the same way as if he had created it himself.

Similarly, this invention may be implemented by the buyer's PC (1) by entering the appropriate creation programme for the card. The characteristics of the temporary card so created and especially its temporary identification data ate then automatically transferred via the Internet network (2) and the SSL link to the server (4). As an alternative, these data may be transferred directly by the buyer to the server (4) using his telephone (6), for instance by sending an SMS.

The buyer, with direct data identification information on his temporary card so created via his telephone (6) or his PC (1) is then ready to use it.

The buyer only needs then to enter the number and the date of validity in the order form for the sales site (3).

Since the number and the validity date entered by the buyer are perfectly similar to those of a classical payment card, the seller needs not change his dealing procedure to accept the order from the card owner, paid with his temporary card. The seller has anyway no possibility to make a difference between the numbers, therefore the type of payment card given to him.

The seller thus makes a request for authorisation in a highly classical way. Having obtained in return the authorisation requested for, the deal is validated and the book ordered may be delivered to the buyer. The seller only needs then to give the corresponding invoice to his financial institution for it to obtain from the issuing institution the transfer of the money.

Of course, the invention is not limited to the modes of execution described.

So the telephone (6) may not be a mobile telephone of the GSM type or other, but a telephone connected to the commuted public telephone network PSTN (Public Switching Telephone Network) and with the appropriate calculation abilities.

So the identification data for the payment cards transmitted to the server (4) via the telephone may be so in different ways and not only via SMS. So they may be transmitted vocally (oral enunciation on line), clear or coded using a coding key of the Jules Cesar type, in which for each digit from zero to nine is associated a letter, the coding key having been given before and in a safe way by the financial institution to the user.

Thus, when acceding to server (4) by telephone (6) (either via the PTSN network (Public Switching Telephone Network) or by a radio telephone network of the GSM type for instance) to transmit identification data for the temporary card created and the conditions of use for it, the identification of the user may be made in several ways: using a speech recognition system, using the secrete code typed on the telephone keyboard or given verbally on the line, sending a predefined message, etc.

What is claimed is:

1. A method for securely providing identification data of a banking card to a user, comprising:
    directly creating said identification data of the banking card by said user from appropriate generating means; and
    communicating the generated identification data through a telecommunication means to a computer server of a financial institution managing said banking card,
    wherein said appropriate generating means comprises appropriate software fitted on a SIM card configured to use with a cellular radio telephone of GSM type, wherein said identification data is communicated to the computer server via a cellular radio telephone network as an SMS message.

2. The method according to claim 1, wherein said identification data consists of a number and a validity date of said banking card.

3. The method according to claim 1, wherein said telephone automatically communicates said identification data to said computer server.

4. The method according to claim 1, wherein said banking card is only valid for a limited number of deals and for a limited time.

5. The method according to claim 1, wherein said banking card is only valid for a single deal.

* * * * *